United States Patent [19]
Wang et al.

[11] Patent Number: 6,004,610
[45] Date of Patent: Dec. 21, 1999

[54] COMPOSITIONS OF DIETARY FIBER RICH AND LOW VISCOSITY BEVERAGES

[75] Inventors: Linji Wang, Pittsburgh; John P. Troup, Wexford, both of Pa.

[73] Assignee: General Nutrition Corporation, Pittsburgh, Pa.

[21] Appl. No.: 09/097,934

[22] Filed: Jun. 16, 1998

[51] Int. Cl.$^6$ ........................................... A23L 2/02
[52] U.S. Cl. ............................ 426/599; 426/590; 426/49; 426/51
[58] Field of Search ............................... 426/590, 49, 51, 426/599

[56] References Cited

U.S. PATENT DOCUMENTS

| | | |
|---|---|---|
| 3,294,544 | 12/1966 | Stanko . |
| 3,443,957 | 5/1969 | Segel et al. . |
| 3,704,138 | 11/1972 | LaVia et al. . |
| 3,737,322 | 6/1973 | Frey . |
| 3,738,843 | 6/1973 | Frey . |
| 4,228,198 | 10/1980 | Burge et al. . |
| 4,639,374 | 1/1987 | Matsunobu et al. ....................... 426/43 |
| 4,946,702 | 8/1990 | Stipp et al. ............................... 426/599 |
| 4,988,530 | 1/1991 | Hoersten et al. ........................ 426/577 |
| 5,073,397 | 12/1991 | Tarr et al. . |
| 5,374,444 | 12/1994 | Langner ................................... 426/590 |
| 5,437,880 | 8/1995 | Takaichi et al. ........................... 426/73 |
| 5,447,741 | 9/1995 | Goldman . |
| 5,518,710 | 5/1996 | Bhatty . |
| 5,558,897 | 9/1996 | Goldman . |
| 5,614,242 | 3/1997 | Fox . |
| 5,753,295 | 5/1998 | Goldman ................................. 426/590 |
| 5,851,578 | 12/1998 | Gandhi ..................................... 426/590 |

FOREIGN PATENT DOCUMENTS

| | | |
|---|---|---|
| 0316146 A1 | 5/1989 | European Pat. Off. . |
| 0574034 A1 | 12/1993 | European Pat. Off. . |
| 2154673 | 6/1990 | Japan . |

OTHER PUBLICATIONS

LaBell, Prepared Foods, vol. 167(5), p. 146, May 1998.
LaBell, Prepared Foods, vol. 164(11), p. 87, 1995.
Bar et al., Intl. Food Ingreds., vol. 6, pp. 39–42, 1994.

*Primary Examiner*—Chhaya D. Sayala
*Attorney, Agent, or Firm*—Reed Smith Shaw & McClay LLP; Raymond A. Miller

[57] ABSTRACT

The present invention is directed to compositions of a fiber blend and a fiber rich, low viscosity beverages. The fiber blend and fiber beverage are enriched with low viscosity fibers including both arabinogalactan and hydrolyzed guar gums.

30 Claims, No Drawings

COMPOSITIONS OF DIETARY FIBER RICH AND LOW VISCOSITY BEVERAGES

FIELD OF THE INVENTION

The present invention relates to dietary and nutritional supplements for human consumption and more particularly, beverages enriched with dietary fibers.

BACKGROUND OF THE INVENTION

Medical and nutrition studies in the past thirty years have established that dietary fiber is a necessary dietary element for good human health. Low intake of dietary fiber is associated with high incidents of several diseases including coronary heart disease, diabetes, obesity, and colon cancer. Dietary fiber is broadly divided into water soluble and water insoluble subgroups. Plant and fungi foods are major sources of dietary fiber. Dietary fiber functions as a gastrointestinal regulator in food digestion process. The modes of action of dietary fiber in the human gastrointestinal tract include providing mechanical distention through its water holding activity, stimulating bowel movement, slowing down the gastrointestinal transition and digestion process, modifying fat absorption, increasing bile acids excretion, and detoxicating toxic substances. Soluble dietary fibers are found to have cholesterol-lowering and leveling postprandial glycemic response effects in clinical studies.

Average intake of dietary fiber in the United States is reported to be 13 grams per day per person. The USDA currently recommends that dietary fiber intake be 25 grams for people with a diet of 2,000 calories intake per day and 30 grams for people with a diet of 3,000 calories per day. In order to increase dietary fiber intake from 13 grams per day to 25 grams per day or even 30 grams per day, one would need to ingest an extra 12 grams to 17 grams of dietary fiber per day. Relying on vegetables, fruits and grains as the source of dietary fiber would requires at least double the consumption of these products per day. This approach would require a dramatic change of lifestyle, which appears to be difficult to accomplish in today's fast-paced society where most food items are highly processed for convenience and ease of preparation and consumption. In view of the desire for fast, convenient yet healthy foods, a practical approach for sufficient dietary fiber intake is to enrich processed food products with dietary fiber. It would therefore be advantageous to enrich the most frequently consumed convenient food items such as beverages, pastries and baked products with dietary fiber.

Beverage products, which are suitable for fiber enrichment, include vegetable juice, fruit juice, and other beverages traditionally containing sugar, color and flavorings. Many sources of soluble dietary fiber are commercially available which have potential uses in beverage application. Among some of the most popular soluble fiber sources are guar gum, pectin, psyllium husk, carageenan, methylcellulose and hydroxypropanylmethylcellulose. Unfortunately, these fibers are known to increase viscosity of a beverage thereby making the beverages unpalatable.

Guar gum has been used for human consumption for over fifty years. Clinical studies have shown that guar gum lowers plasma total and LDL cholesterol and postprandial glycemic responses. Guar gum is partially digestible. Its digestible energy value is almost 4 calories per gram. Guar gum is a highly viscous gum; an aqueous solution of 1% guar gum has a viscosity of 3000 centipoise. When hydrolyzed, guar gum becomes less viscous. Partially hydrolyzed guar gum is a commercially available product available from several suppliers. One example of partially hydrolyzed guar gum is BENEFIBERT™ manufactured by Sandoz Nutrition Ltd. Golay et al. (1995) reported a beverage application using hydrolyzed guar gum and its benefit in lowering glycemic responses in diabetic patients.

Arabinogalactan, also called larch gum, is extracted from western larch trees. It is a long, densely branched polysaccharide with molecular weight ranging from 10,000–120,000. Galactose and arabinose, the building blocks of arabinogalactan, are at a ratio of about as 6 to 1 in the polysaccharide molecule. Some in vitro lab studies have shown that arabinogalactan shows promise in strengthening immune function and antiviral effects. Japanese Publication No. JP02154673 and Japanese Publication No. JP 02215353, discloses the manufacture of beverages with arabinogalactan. U.S. Pat. Nos. 3,294,544, 3,443,955, 3,704,138, 3,737,322, 3,738,843, and 4,228,198 disclose using arabinogalactan as a sweetener or food ingredient, but a use for beverages was not disclosed.

SUMMARY OF THE INVENTION

The present invention relates to compositions of a beverage enriched with a low viscosity dietary fiber. The dietary fibers used in the present invention are arabinogalactan and partially hydrolyzed guar gum.

The present invention focuses fiber blend for beverage application. The invention further describes a fiber blend comprising both arabinogalactan and partially hydrolyzed guar gums.

The present invention uses a beverage as a convenient vehicle for delivering dietary fiber to the general population. Partially hydrolyzed guar gum and arabinogalactan are used because of their low viscosity, lightness in color and lack of taste. Each serving (10 oz) of the present beverage delivers approximately 3 grams of dietary fiber. The beverage may comprise partially hydrolyzed guar gum, arabinogalactan and flavorings. The beverage can be carbonated or non-carbonated.

The present invention is directed to a low viscosity beverage which is comprised of a fiber blend mixed in water. The low viscosity beverage is characterized by the fact that it has a viscosity less than about 65 centipoise, more preferably less than about 40 centipoise and most preferably in the range of about 4 centipose to 20 centipoise and most preferably a viscosity of about 10 centipoise. The low viscosity beverage described herein contains a fiber blend which may include hydrolyzed guar gum and arabinogalactan. The fiber blend is preferably in the range from about 1.5% to about 10% in weight percent of the total formulation and most preferably is in the range of about 1.7% to about 5% and most preferably about 1.8%. The low viscosity beverage described herein may include citric acid and/or sodium citrate and may also further include a flavor extract selected from the group consisting of apple extract, spinach extract, tomato extract as well as other common fruit and vegetable flavor extracts common in the industry. The flavor extract is in the range of about 0% to about 5% weight percent of the overall beverage formulation and when spinach extract is used it is preferably in the range of about 0% to about 2% of the overall formulation. The low viscosity beverage of the present invention has a generally clear characteristic and may be carbonated to increase its appeal The water to be used in the present formulation may be tap water, spring water, distilled water and/or deionized water. The fiber blend used to formulate the low viscosity beverage of the present invention is normally comprised of partially hydrolyzed guar gum and arabinogalactan. The overall content in the fiber blend of hydrolyzed guar gum is in the range of about 20% to about 50% and more preferably in the range of about 30% to 40% and most preferably about 35%. The overall content of the arabinogalactan in the fiber blend is in the range of about 15% to about 60%, more preferably in the range of about 20% to 50% and even more preferably in the range of about 30% to about 40% and most preferably in the range of about 35%. The fiber blend used for formulate the low viscosity beverage may also include citric acid and/or sodium citrate. In the fiber blend, the overall content of the citric acid is in the range of about 10% to 40% more preferably in the range of about 20% to 30% and most preferably around 23.5%. While the overall concentration or content of the sodium citrate in the fiber blend is in the range of about 3% to 9% more preferably in the range of about 5% to 7% and most preferably in the range of about 6.5%.

Finally, when formulated in a beverage, the beverage may also include a high fructose corn syrup which may be about 40 DE or 60 DE. The beverages of the present invention have an overall pleasant mouthfeel, low viscosity, good clarity, and acceptable total solid concentration and precipitation. The beverage has as much fiber as possible while having the lowest viscosity and no precipitation. At a viscosity of about 10 centipoise the consumer of the beverage does not detect the sliminess often found in beverages having higher viscosity levels than 10 centipoise. The present invention provides a beverage which has a desirable concentration of fiber providing about 3 grams of dietary fiber for a typical 10 ounce serving.

The features, aspects and advantages of the present invention will become better understood with regard to the following description and appended claims.

DETAILED DESCRIPTION OF THE PREFERRED EMBODIMENTS

Beverages are one of the most popular food form. Dietary fiber enrichment for beverages would greatly facilitate the implementation of 25 to 30 grams of dietary fiber intake recommended by the USDA. Sources of soluble dietary fiber commercially available for beverage applications include guar gum, locust bean gum, fenugreek gum, psyllium husk fiber, quince seed gum, pectin, Irish moss, acacia gum, arabic gum, ghatti gum, karaya gum, tragacanth, carageenan, alginate, xanthan gum, methylcellulose, hydroxypropylcellulose and carboxymethylcellulose. However, almost all of these sources are highly viscous in water solution. Among the list above, with the exception of acacia gum, the rest may generate a viscosity of 50 centipoise or higher in a beverage, which gives a noticeable viscosity. Hence, the beverage may not be acceptable for consumers. Though low in viscosity, gum acacia has been reported to cause an allergic reaction in a subgroup of the population; thereby making it unacceptable for use.

The present invention uses partially hydrolyzed guar gum and arabinogalactan as dietary fiber sources for use in beverages. Both hydrolyzed guar gum and arabinogalactan are low in viscosity. A 10% aqueous solution of partially hydrolyzed guar gum has a viscosity of approximately 20 centipoise, while an aqueous solution with 10% arabinogalactan has a viscosity of about 4 centipoise. For purposes herein, the term "about" means plus or minus ten percent (10%) of the number at issue (i.e., "about 10" means in the range of 9–11 ).

Another important quality parameter for beverage is clarity. A homogenous, clear body is desired for beverage products. Low viscosity is usually the cause of precipitation. In the present invention, it has been found that a beverage composition having approximately 1% to 1.8% of a fiber blend comprising partially hydrolyzed guar gum and arabinogalactan will have very low viscosity and desirable clarity, with no precipitation.

The following examples of beverage compositions follow the teaching of the present invention.

EXAMPLE I

A beverage preferably containing the following composition:

| Water | 296.96 g | 98.98 |
|---|---|---|
| Partially hydrolyzed guar gum | 1.52 g | 0.51 |
| Arabinogalactan | 1.52 g | 0.51 |
| Total | 300 g | 100 |

The dietary fibers are mixed with water. The solution is then carbonated at a specific temperature and time known to those skilled in the art.

EXAMPLE 2

A beverage preferably containing the following composition:

| Water | 296.40 g | 98.88 |
|---|---|---|
| Partially hydrolyzed guar gum | 1.52 g | 0.51 |
| Arabinogalactan | 1.52 g | 0.51 |
| Flavoring | 0.30 g | 0.10 |
| Total | 300 | 100 |

The dietary fibers are dissolved using constant agitation in water. Flavoring is added and the beverage is carbonated at specific time and temperature known to those skilled in the art. The flavoring can be one or any one of the combinations of known flavorings. For example, the present invention contemplates using apple extract (0% –5%), spinach extract (0% to 2%), or tomato extract (0%–5%).

EXAMPLE 3

A fiber blend preferably containing the following composition:

| Citric acid | 1.27 | 23.61 |
|---|---|---|
| Sodium citrate | 0.35 | 6.51 |
| Hydrolyzed guar gum | 1.88 | 34.94 |
| Arabinogalactan | 1.88 | 34.94 |
| Total | 5.38 | 100 |

Citric acid (10% to 40%), sodium citrate (3% to 9%), hydrolyzed guar gum (20% to 50%) and arabinogalactan (15% to 60%) are mixed together to form a dry fiber blend.

EXAMPLE 4

A beverage preferably containing the following composition:

| | | |
|---|---|---|
| Water | 264.31 | 88.10 |
| High fructose corn syrup | 30.27 | 10.09 |
| Fiber blend from example 3 | 5.36 g | 1.79 |
| Spinach extract | 0.01 g | 0.02 |
| Total | 300 g | 100 |

Partially hydrolyzed guar gum, arabinogalactan, citric acid and sodium citrate are mixed together first forming a dry blend which is then dissolved in water using constant agitation. The corn syrup is then added to the solution. The beverage is then aseptically packaged using a process known to those skilled in the art. The citric acid content of the beverage is in the range of from about 0% to about 3%. The sodium citrate content of the beverage is in the range of from about 0% to about 1%.

The fiber blend shown in Example 3 above does not impart any detectable viscosity, color, taste or mouthfeel to the beverage. The fiber blend is an off-white and tasteless mix. The beverages have a very low viscosity preferably within a range of about 4 centipoise to about 20 centipoise and more preferably less than 10 centipoise and a clear and homogenous body. The beverage is shelf stable for two years without precipitation or flocculation development.

While the foregoing has been set forth in considerable detail, the compositions and methods are presented for elucidation, and not limitation. Modifications and improvements, including equivalents, of the technology disclosed above which are within the purview and abilities of those in the art are included within the scope of the claims appended hereto. It will be readily apparent to those skilled in the art that numerous modifications, alterations and changes can be made with respect to the specifics of the above description without departing from the inventive concept described herein.

What is claimed is:

1. A low viscosity beverage comprised of hydrolyzed guar gum, arabinogalactan, and water, said low viscosity beverage having a viscosity less than about 40 centipoise, and being clear.

2. The beverage of claim 1, wherein a combined concentration of said hydrolyzed guar gum and arabinogalactan is in a range of about 2% (wt/wt %) to about 20% (wt/wt %) of the clear beverage.

3. The beverage of claim 2, further including citric acid.

4. The beverage of claim 3, further including sodium citrate.

5. The beverage of claim 1, further including a flavor extract.

6. The beverage of claim 5, wherein said flavor extract is selected from the group consisting of apple extract, spinach extract, and tomato extract.

7. The beverage of claim 6, wherein said flavor extract is in a range of about 0% (wt/wt %) to about 5% (wt/wt %) of the clear beverage.

8. The beverage of claim 7, wherein said flavor extract is spinach extract, said spinach extract being not less than about 2% (wt/wt %) of the clear beverage.

9. The beverage of claim 1, wherein said beverage is carbonated.

10. The beverage of claim 1, wherein a combined concentration of said hydrolized guar gum and arabinogalactan is in the range of about 1% (wt/wt %) to about 10% (wt/wt %).

11. The beverage of claim 10, wherein said concentration of said hydrolized guar gum and arabinogalactan is in the range of about 1.5% (wt/wt %) to about 3% (wt/wt %).

12. The beverage of claim 11, wherein said viscosity is less than about 10 centipoise.

13. A beverage comprised of hydrolyzed guar gum, arabinogalactan and an extract selected from the group consisting of vegetable and fruit extracts.

14. The beverage of claim 13, wherein said extract is spinach extract.

15. The beverage of claim 13, wherein said extract is apple extract.

16. The beverage of claim 13, wherein said extract is tomato extract.

17. The beverage of claim 13, wherein said beverage is carbonated.

18. The beverage of claim 13, wherein said beverage has a pleasant mouth feel.

19. The beverage of claim 13 further including corn syrup as a natural sweetener.

20. A method of making a beverage comprised of formulating arabinogalactan, hydrolyzed guar gum, and water to thereby form a clear beverage.

21. The method of claim 20, wherein said hydrolyzed guar gum and arabinogalactan make up from about 2% (wt/wt %) to about 20% (wt/wt %) of said beverage.

22. The method of claim 20, further including the step of adding a flavor extract to said beverage.

23. The method of claim, 22, wherein said flavor extract is selected from a group consisting of apple extract, spinach extract, and tomato extract.

24. The method of claim 23, wherein said flavor extract is above 0% (wt/wt %) but less than about 5% (wt/wt %) of said beverage.

25. The method of claim 20, wherein said beverage is carbonated.

26. The method of claim 20, wherein said beverage is non-carbonated.

27. A method of enhancing an individual's intake of dietary fiber comprised of administering beverage which includes hydrolyzed guar gum, arabinogalactan and an extract.

28. The method of claim 27, wherein said juice extract is selected from the group consisting of apple, spinach, and tomato extract.

29. The method of claim 27, wherein said beverage is a carbonated beverage.

30. The method of claim 27, where said beverage is a non-carbonated beverage.

* * * * *